United States Patent [19]

Rabow et al.

[11] 4,206,462
[45] Jun. 3, 1980

[54] SECURE COMMUNICATION AND RANGING SYSTEM

[75] Inventors: Gerald Rabow, Brooklyn, N.Y.; Alvin E. Nashman, Rutherford, N.J.

[73] Assignee: International Telephone and Telegraph Corporation, New York, N.Y.

[21] Appl. No.: 87,961

[22] Filed: Feb. 8, 1961

[51] Int. Cl.² .............................................. H04K 1/00
[52] U.S. Cl. ..................................... 343/7.6; 178/22; 179/1.5 R; 343/6.5 R; 343/12 R; 375/2; 455/28; 455/30
[58] Field of Search ..................... 343/6.5, 6.8, 18, 12, 343/17.1, 11, 7.6; 250/6.6; 179/1.5; 178/22, 5.1; 325/32, 34

[56] References Cited
U.S. PATENT DOCUMENTS
3,016,519  1/1962  Lindner ........................... 340/171 R Primary Examiner—Maynard R. Wilbur
Assistant Examiner—Richard E. Berger
Attorney, Agent, or Firm—John T. O'Halloran; Alfred C. Hill

EXEMPLARY CLAIM

15. In a secure communication system a transmitter comprising first means to modulate a carrier wave with a sub-carrier wave and a desired signal, a code generator synchronized to said sub-carrier wave, second means to modulate the output of said first modulating means with the output of said code generator, and means to transmit the output of said second modulating means to a distant receiver.

16 Claims, 6 Drawing Figures

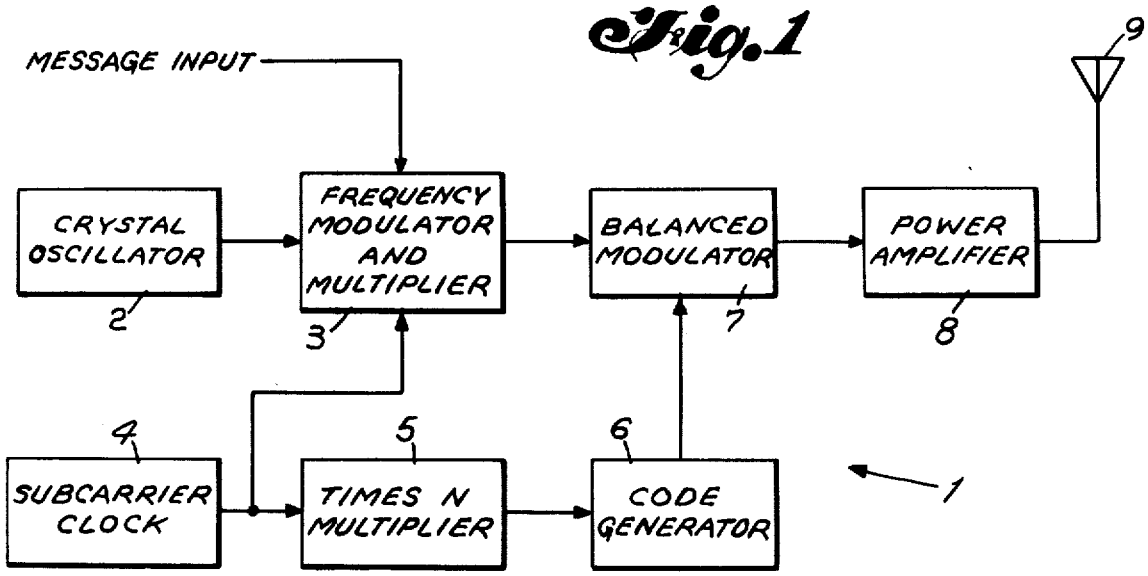
Fig. 1
| | | |
|---|---|---|
| FREQUENCY SPECTRUM OUTPUT OF FREQUENCY MODULATOR 3 | A | 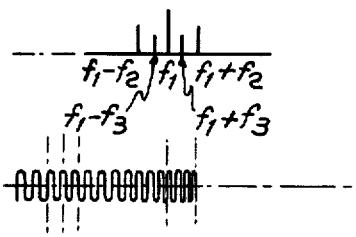 |
| OUTPUT SIGNAL OF FREQUENCY MODULATOR 3 | B |  |
| CLOCK RATE | C |  |
| SEGMENT OF CODE WORD $b(t)$ | D | 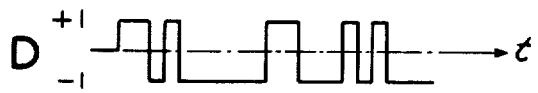 |
| AUTO CORRELATION FUNCTION OF $b(t)$ | E | 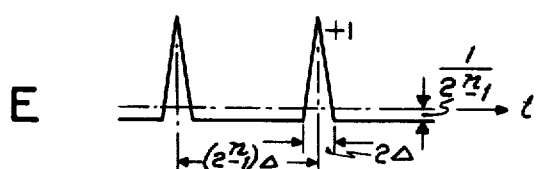 |
| POWER SPECTRAL DENSITY OF $b(t)$ | F | 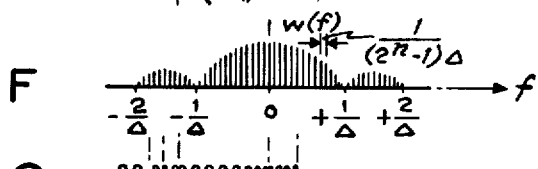 |
| OUTPUT OF BALANCED MODULATOR 7 | G |  |
Fig. 3

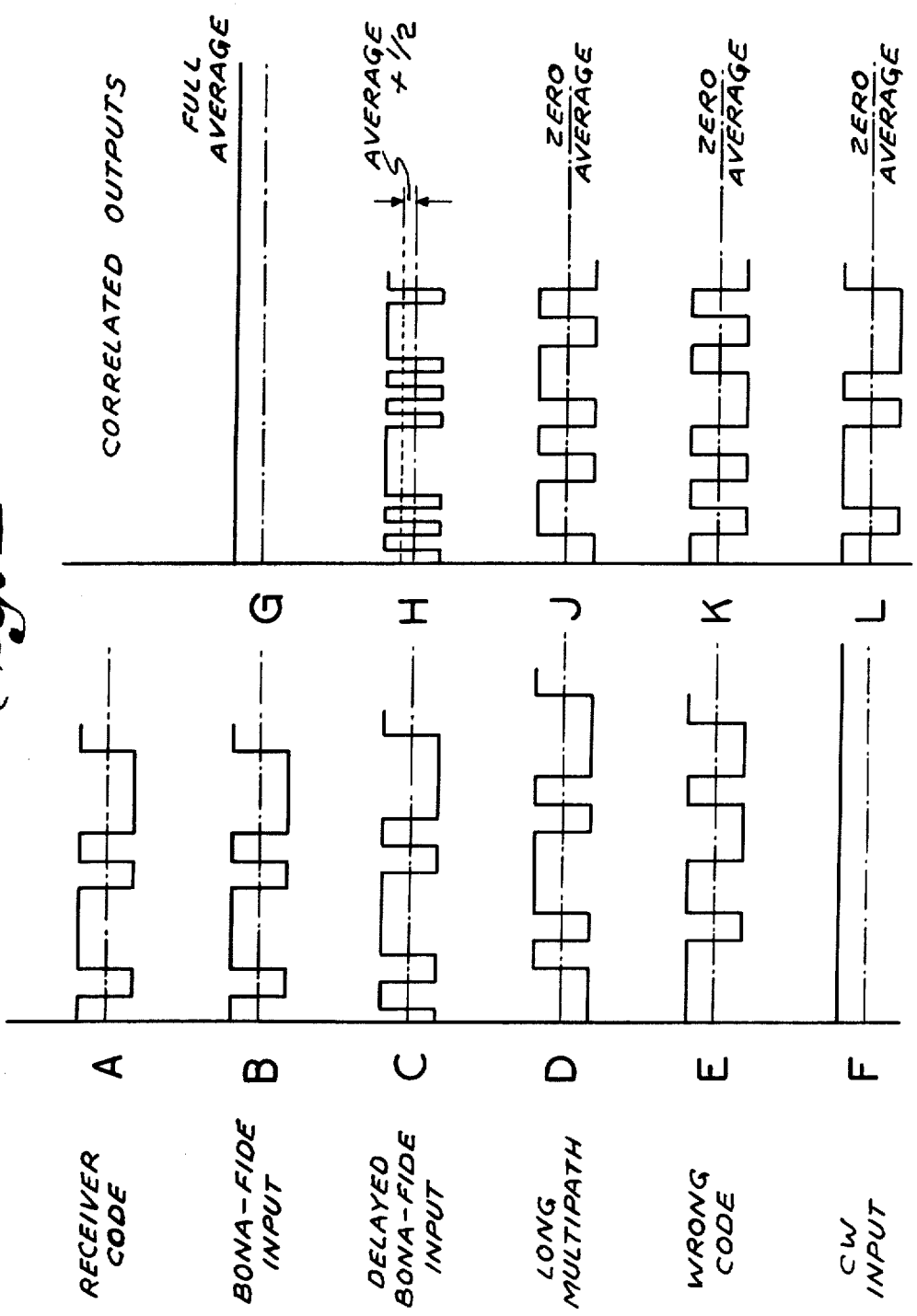

SECURE COMMUNICATION AND RANGING SYSTEM

This invention pertains to secrecy communication systems in which an intelligence signal is transmitted in coded form to be utilized only in a receiver equipped with a decoding device controlled in accordance with the coding schedule employed at the transmitter and modulating signals are utilized to determine the range between two stations having such transmitters and receivers.

Various secrecy systems have been prepared in which an intelligence signal, for example an audio signal, is coded by altering some characteristic of that signal, such as phase, usually at randomly spaced time intervals determined by a prescribed code schedule which is made known only to authorized receivers. Compensating alterations are effected at each receiver in accordance with the prescribed code schedule effectively to decode the coded intelligence signal. In order to maintain precise synchronization as to the exact occurrences of the mode changes, that is the alterations or variations of the intelligence signal, it is usually necessary to provide some additional apparatus. This may be accomplished, for example, by employing at the transmitter and various receivers code storage devices such as rotating discs, or tapes upon which the code schedule is recorded; rotation of these discs or tapes may then be conveniently synchronized from the existing 60-cycle power system. It may also be desirable in order to enhance the secrecy aspects of the system to employ a flexible or varying code schedule which changes from moment to moment rather than a fixed repetitive schedule as is the case with the code storage devices. One method of obtaining such flexible operation is to transmit precisely timed pulses each having at least one relatively steep-shaped edge. The decoding apparatus may then utilize the pulses to execute mode changes in exact time coincidence with the mode changes at the transmitter since the sharp edge of the pulses may effect instantaneous operation. While the transmission of sharply defined pulses along with the coded intelligence signal does effect very adequate coding or unscrambling of the signal, which makes it difficult for an unauthorized person to decode or decipher the coded signal in view of the complex and nonrepetitive nature of the code schedule, this type of transmission presents the difficulty that a coding signal must be transmitted.

It is accordingly an object of this invention to provide a secrecy communication system employing similar code generators at the transmitter and receiver synchronized to each other in a novel manner.

Another object is to provide a secrecy communication system wherein the synchronization system is immune against jamming.

Still another object is to utilize the modulating signals of the secrecy communication system to determine the range between two stations each having the transmitter and receiver of the system.

A feature of this system is a transmitter comprising means to modulate a carrier wave and a subcarrier wave with the intelligence signal to produce a modulated narrow band signal. Means are provided responsive to the subcarrier wave to spread the spectrum of the narrow band modulated signal and to transmit the wide band modulated signal. A receiver responsive to the transmitted signal comprises means to demodulate the received signal and to produce a narrow band width signal. The receiver further comprises means to derive the subcarrier wave from the narrow band width signal and means responsive to the derived subcarrier to synchronize the demodulating means of the receiver to be equal in phase and frequency with the transmitter spectrum spreading means.

Another feature is that the means to spread the spectrum of the modulated signal comprises a code generator synchronized to the subcarrier wave and the receiver comprises a similar code generator which is coupled to the demodulating means to demodulate the received signal and thus derive the narrow band width signal. The receiver code generator is similar to the transmitter code generator. Means are further provided in the receiver to derive the subcarrier signal from the narrow band width signal and the derived subcarrier signal is coupled to the receiver code generator whereby the output of the receiver code generator is made equal in frequency and phase to the output of the transmitter code generator. Still another feature is that range determination between two spaced apart stations each containing a receiver and transmitter as described above can be made by ascertaining the phase difference between the transmitter subcarrier wave and the derived subcarrier of the receiver at the same location. This phase difference is a fine indication of the range. The coarse indication of range is made by counting the number of cycles of the transmitter subcarrier wave in the interval between the start of a code word in the transmitter code generator and the start of a code word in the receiver code generator.

These and other features and objects of this invention will become more apparent by reference to the following description taken in conjunction with the accompanying drawings, in which:

FIG. 1 is a block diagram of the transmitter of this invention;

FIG. 3 is a graph of wave forms useful in explaining the operation of the system;

FIG. 4 is a graph of waveforms;

Figure 2:
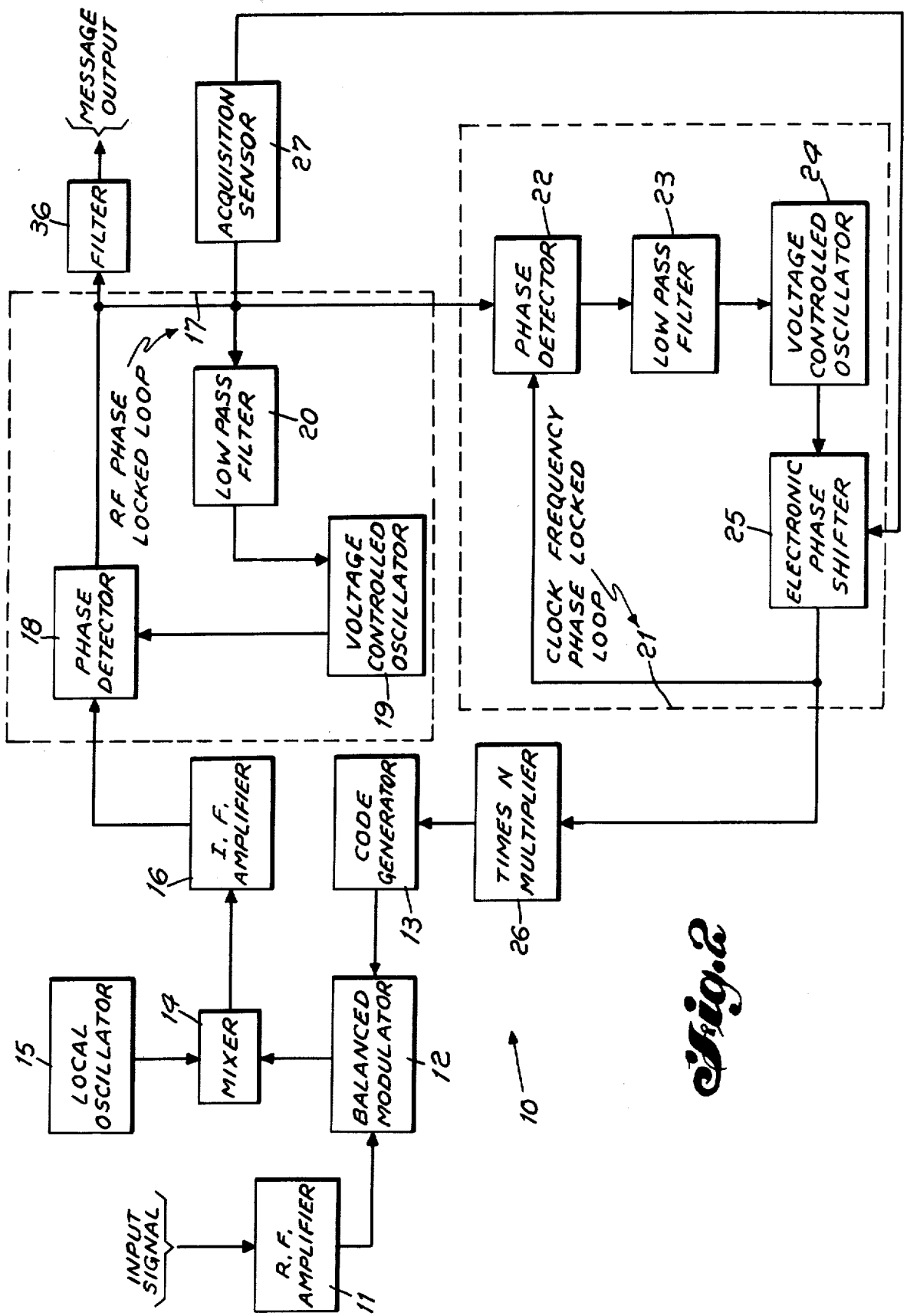
FIG. 2 is a block diagram of the receiver.

Psuedo-noise communication systems are being increasingly used in systems where electronic security and jamming resistance are important. Such systems employ a radio frequency carrier which is perturbed in a prearranged manner by means of a code generator at the transmitting end; at the receiving end the incoming signal is perturbed in an equal but opposite manner by similar code generator thus restoring the original signal. In this system, as in similar systems, the problem is to keep the two code generators properly synchronized once they have been initially synchronized even though the transmitter and receiver may be in relative motion. In some cases it is necessary to alter the speed of the receiving code generator with respect to the transmitting code generator in order to account for changes in signal propagation time. In this system the novel means of synchronizing two code generators is to synchronize each of them to a sinusoidal signal. The transmitter's code generator is synchronized to a locally generated sine wave or clock signal. This clock signal is then modulated onto the radio frequency carrier becoming then the subcarrier and is transmitted to the receiver. If the receiver code generator is in proper synchronism, the original radio frequency is restored and the subcarrier can be recovered. The recovered subcarrier is then used as a clock signal for the receiver code generator. The transmitter and receiver code generators are thus synchronized to the same subcarrier and therefore synchronized to each other. If the transmitter and receiver may be in relative motion and the propagation time changes due to relative motion of the transmitting and receiving stations, the propagation time for the coded signal and the subcarrier changes identically, and the synchronization is thus undisturbed.

Referring now to FIG. 1, there is shown the block diagram of a transmitter 1 having a crystal oscillator 2 generating a sine wave signal of frequency $f_1$ the output of which is fed to a frequency modulator and multiplier 3. A subcarrier clock or oscillator 4 generates another sine wave signal of frequency $f_2$. The output of the subcarrier clock 4 is fed into the frequency modulator 3 together with a message input or intelligence signal which is of the frequency $f_3$. The output of the frequency modulator is then a frequency modulated narrow band width signal of the form $$i = \cos(2\pi f_1 t + m_1 \cos 2\pi f_2 t + m_2 \cos 2\pi f_3 t).$$

FIG. 3 shows the more significant sidebands for low index frequency modulation to illustrate the operation of the system. There are, of course, an infinite number of sidebands. The frequency spectrum of this modulated signal with its carrier and sub-carrier sidebands is shown in wave form A of FIG. 3. The output of the subcarrier clock 4 is coupled to a Times N multiplier 5 and the output of the multiplier 5 is coupled to a code generator 6. The code generator 6 may be of the type described on page 559 of the article "A Communication Technique for Multipath Channels" by R. Price and P. E. Greene, Jr., published in the proceedings of the IRE for March, 1958. The code of the code generator 6 is generated by a multiple stage binary shift register with logical feedback. The output of the code generator is a MARK and SPACE binary sequence running typically at a specific clock rate. The sequence has many of the properties of a random sequence of 1's and 0's (or $-1$'s and $+1$'s) as could be obtained from tossing a coin every fraction of a microsecond. That is to say the sequence has the random properties during the length of the sequence and then repeats again in the same random sequence to produce a repetitive code. The output of the code generator is coupled to a balanced modulator 7 as is the output of the frequency modulator 3. The phase of the transmitted signal is controlled in the balanced modulator 7 by the output of the code generator 6. That is, the phase of the output of the modulator 3 is reversed 180° each time the code sequence goes from 0 to 1 or vice versa. The resulting spectrum is then spread over a frequency that between null points is twice the clock frequency. The output of the balanced modulator is coupled to power amplifier 8 and transmitted through the antenna 9. The output of the transmitter 1, which has the characteristic of noise is thus referred to as a psuedonoise signal.

Referring to FIG. 2, the transmitted signal is received in the receiver 10 and amplified in the RF amplifier 11. The output of the RF amplifier is coupled to a balanced modulator 12 to which is also fed the output of a code generator 13 similar to the code generator 6 of the transmitter 1. If the code generator 13 output is of the correct phase, then the phase reversals produced in the balanced modulator 12 will restore the original signal; that is, the signal out of the frequency modulator 3 in the transmitter 1. The signal output of the balanced modulator 12 is coupled to a mixer 14 and mixed with the signal from a local oscillator 15 to be converted to the IF frequency which is amplified in the IF amplifier 16. The signal is then demodulated in the RF phase locked loop 17, consisting of a phase detector 18, a voltage controlled oscillator 19, and a low pass filter 20. As stated above the carrier is frequency modulated with the clock frequency sub-carrier and the message input signal. This frequency modulation also, as is known, causes a phase modulation. Therefore a comparison of the phase of the received signal with a reference signal will produce an output which is indicative of the phase difference between the received signal and the reference signal. In effect, the IF signal is demodulated in the phase detector 18 to detect the clock frequency subcarrier signal and the message signal. Actually the phase detector 18 produces an output voltage which is proportional to the signal input to the phase detector and the reference signal i.e. the output of voltage controlled oscillator 19. The phase of the IF signal should be the same as the phase of the reference signal; if not there is a direct current error output signal in the output of phase detector 18 which passes through the low pass filter 20 and corrects the phase of the voltage controlled oscillator 19. The voltage controlled oscillator 19 is maintained in phase with the carrier coming through the IF amplifier 16. Any error in the phase of the oscillator 19 is detected in the phase detector 18 and fed back through the phase locked loop 17 to reduce the error. The high frequency modulation in the signal from the IF amplifier 16, including the clock frequency subcarrier and the intelligence signal or message input, will be detected and appear at the phase detector 18 output since these will not be corrected out due to the low pass filter 20.

The clock frequency sub-carrier $f_2$ is separated from messages and most of the noise in the clock frequency phase locked loop 21, which consists of a phase detector 22 to which is coupled the output of phase detector 18, a low pass filter 23, a voltage controlled oscillator 24 and an electronic phase shifter 25. The output of the voltage controlled oscillator 24 is a signal in the vicinity of the clock frequency subcarrier. If this signal is not of correct phase, an error voltage is generated in the phase detector 22 which drives the voltage controlled oscillator 24 in such a direction as to bring its output into proper phase relation with the clock frequency subcarrier component of the input signal. An input component of frequency fx will cause a signal of frequency fx—clock frequency subcarrier out of the phase detector 22. Unless this difference frequency is small, it will be rejected by the low pass filter 23. In this way, the message frequency signal and most of the noise are eliminated. A mathematical analysis of this process is given by Margolis, S. G., "The Response of a Phase Locked Loop to a Sinusoid Plus Noise", IRE Transactions PGIT, page 137, published June, 1957. The voltage controlled oscillator 24 is made to be in phase with the signal coming into the phase detector 22. If it is not in phase, an error will be produced at the output of the phase detector 22 which will be passed through the low pass filter 23 to correct the voltage controlled oscillator 24. The output of the voltage controlled oscillator 24 is coupled to a times N multiplier 26 by the electronic phase shifter 25 and the output of the multiplier 26 is coupled to the code generator 13. Thus the code generator 13 is controlled by the voltage controlled oscillator 24. The electronic phase shifter 25 provides a means for establishing initial synchronization. Since the code is repetitive, either advancing or retarding the code generator will permit re-synchronization. The ability to advance or retard permits the use of an optimum search pattern for a particular application. As long as the two code generators 6 and 13 are not in proper phase there is no output from phase detector 18 and slowing down or speeding up of one code generator relative to the other continues due to the action of phase shifter 25. The output phase of voltage controlled oscillator 24 should be the same as the phase of the input to phase detector 22, if it is not in the same phase an error signal output of phase detector 22 will drive the voltage controlled oscillator 24 to the proper phase. In the absence of an incoming signal, the voltage controlled oscillator 24 controls the code generator 13 to high precision to run at the same rate as the transmitter code generator 6. If the code generator 13 is not in phase with the incoming signal, the phase of the code generator 13 can be advanced or retarded at any desired rate by means of the electronic phase shifter 25. During the time that the code generators 6 and 13 are not in synchronism there will be no appreciable output from the phase detector 18 and therefore no input into either the clock frequency phase locked loop 21 or an acquisition sensor 27 which is coupled to the electronic phase shifter 25. The acquisition sensor 27 may comprise a filter centered at the subcarrier frequency f2, a rectifier and amplifier connected in series. As soon as the phase of the code generator 13 has been shifted sufficiently to come into synchronism with the incoming signal, there will be a signal into the acquisition sensor 27 which will transfer control of the code generator 13 to the clock frequency phase locked loop 21 as described above. The function of the acquisition sensor 27 is to sense or detect when a signal comes through the phase detector 18 and on the occurrence of this event stop the changing phase shift by the electronic phase shifter 25. This can be done in a conventional manner by a relay controlled by the output of the acquisition sensor 27. The message output signal is derived from the output of the phase detector 18 by filtering out the subcarrier and in the filter 36.

In the operation of this system the frequency spectrum of the output signal of the frequency modulator 3 has the narrow bandwidth characteristic shown in waveform A of FIG. 3 and is a frequency modulated sine wave as shown in waveform B. The output of the code generator 6 is a binary sequence running typically at a clock rate of 2.5 mc,, waveform C. The random sequence for a code word b(t) is partially shown in waveform D. One of the properties of the random sequence is that its autocorrelation function appears as in waveform E. The power spectral density shown in waveform F is the Fourier transform of the autocorrelation function and has an envelope the shape of a (sin $x^2/x$) function. The bandwidth W between null points is twice the clock frequency and in this case is 5 mc. The fine structure of the spectrum is due to the fact that the sequence is not truly random but is repetitive with a typical period $2^n-1$ where n equals the number of stages in the code generator. The sequence contains all the permutations of the states of the shift register in the code generator except all zeros and is the maximum length of a linear sequence. Many different sequences or codes having the maximum length of the required autocorrelation properties can be generated with the same code generator by merely changing the logic switch connections. For a 15 stage register there are 1800 different maximum length sequences. However there are many more sequences available using non-linear logic. The code generator can be constructed with any number of stages and by doubling the number of stages the word length is squared and the number of available codes is almost squared. For example with 30 stages about $10^6$ codes are available. The phase of the transmitted signal is controlled by the output of the code generator 6 by means of the balanced modulator 7. That is, as shown in waveform G the phase is reversed 180° each time the sequence goes from 0 to 1 or vice versa. The resulting spectrum is spread over 5 mc for a 2.5 mc clock.

The advantages of the system just described is that it rejects to a high degree interfering or jamming signals coming into the receiver, whether they be of the right code but wrong phase, wrong code, uncoded CW, noise modulated, pulsed, etc., or due to long multipath transmissions. In each case the interfering signal will have its phase reversed in the pseudo random manner determined by the Code Generator 13 in the Balanced Modulator 12. The interfering signal into the Mixer 14 and IF Amplifier 16 thus differs in character from the bonafide signal. The bonafide signal is confined to predetermined narrow intervals of bandwidth. The interfering signal will be spread over a bandwidth which approximates twice the code generator frequency which is N times the clock frequency. Some of the interfering signals will be rejected in the IF Amplifier 16. The RF Phase Locked Loop 17 and the phase detector 22 have the property that they will not deteriorate the ratio of bonafide signal to interference. This interfering signal is still spread over a wide bandwidth and will then be rejected in the low pass filter 23. This filter can be quite narrow, since it only has to pass changes in phase of the clock frequency resulting from relative motion of transmitter 1 and receiver 10. The system just described aproaches the maximum theoretically possible rejection of interfering signals, namely, the ratio $$\frac{\text{Radio Frequency Bandwidth}}{\text{Information Bandwidth}} = \frac{N \times \text{Clock Frequency}}{\text{Clock Frequency Phase Locked Loop Bandwidth}}$$

The demodulation process in the receiver 10 has the effect of spreading a non-correlated incoming signal over a bandwidth at least equal to twice the code generator clock rate. In this case, if the clock rate is 2.5 mc, the transmission bandwidth is 5 mc bandwidth with the properties of wideband noise which is labeled "pseudo-noise". After being cross-correlated with the same code in synchronism at the receiver 10 in the balanced modulator 12, the pseudo-noise is reconstructed into a narrow bandwidth about the carrier and subcarrier sidebands and is completely accepted by the narrow band receiver. This is shown diagrammatically in FIG. 4, where waveform A is the receiver code, waveform B is the bona fide input signal and C is a delayed bona fide input signal. In the correlated output i.e., waveform G-L being respectively the products of waveforms B-F and waveform A, the waveform G is the full output where the bona fide input is in synchronism with the receiver code and waveform H is the correlated output with the one-half average signal power, where G is the full signal power received. If an attempt should be made to interfere with either a CW signal, such as waveform F, or with the wrong code, such as waveform E, then as shown in waveforms L and K, the interfering signal power would be spread by the crosscorrelator in the receiver over the 5 mc band and the narrow band receiver will accept very little, if any, of this power. Correlated output refers to the output of acquisition sensor 27 and filter 36. Cross-correlation is the name given to a process of multiplication by a local reference and integration. The process in balanced modulator 12 is one of multiplication, while that occurring in a filter is one of integration; hence the combination of modulator 12, code generator 13, phase detector 18, voltage controlled oscillator 19, filters 20 and 36 and acquisition sensor 27 can be referred to as a cross-correlator. The ratio of the pseudo-noise bandwidth to the information bandwidth determines the protection of the receiver. In the case of multipaths, such as those that result from ionospheric reflections or mountain ranges, these are discriminated against by the system's correlation function because the reflected signal arrives at 0.4 microseconds (usec) (150 meters) or more later than the direct power signal. In this situation, the multipath is converted into pseudo-noise in the same manner as the interference signal described above.

Figure 5:
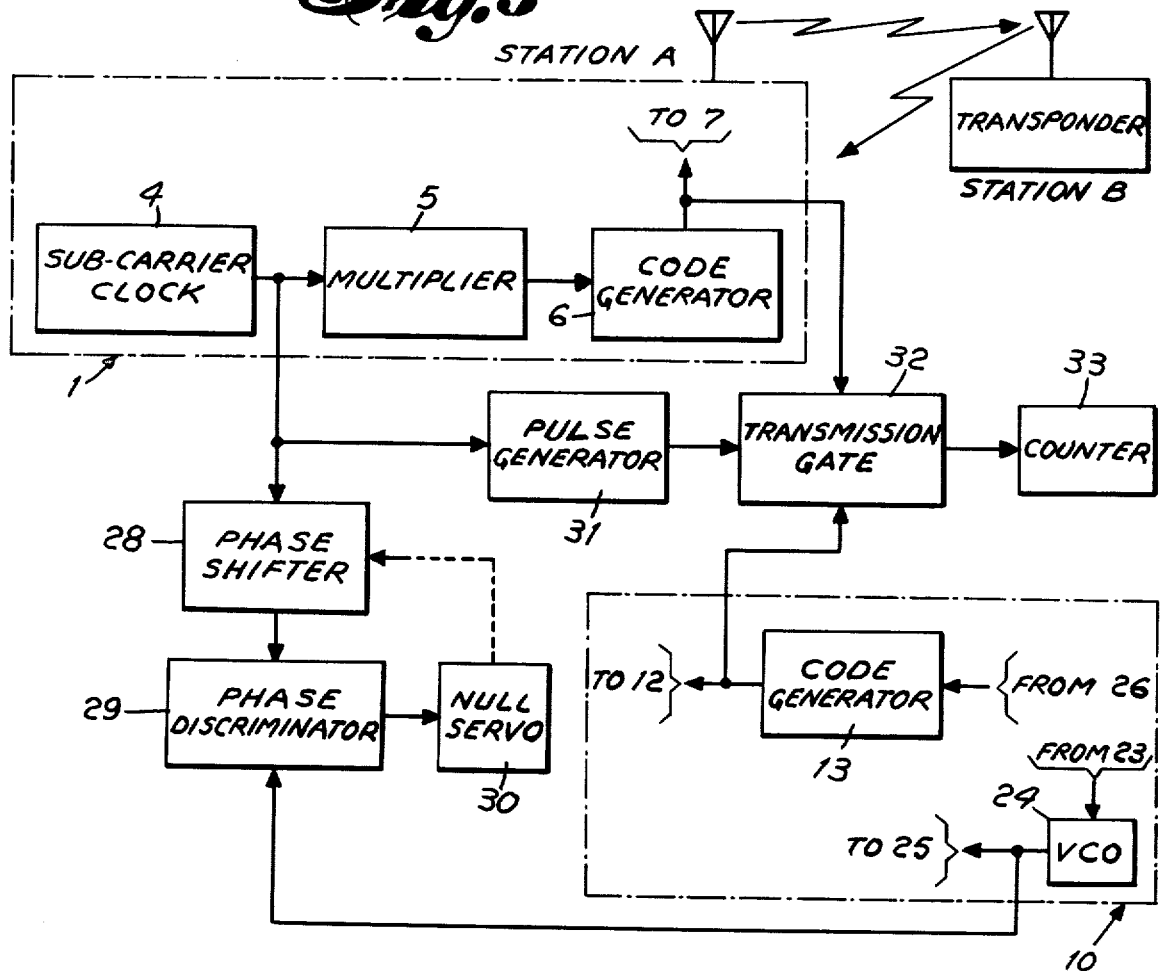
FIG. 5 is a block diagram to illustrate the range determination of this invention.

What has been described before is the case of a secure communication system between a transmitter station 1 in one location, which may be fixed, and a receiver station 2 in another location, which may be fixed or movable if situated in a vehicle. This system is also uniquely adapted to measure the range between two stations which may be fixed or one may be movable relative the other. For the measurement of range between these stations it is necessary that one or both of these stations have the transmitter and receiver of FIGS. 1 and 2 and the other station must have a receiver and transmitter so that it will operate as a transponder and send reply signals when triggered by signals from the fixed station. FIG. 5 illustrates this combination of a station A and a station B, the transponder. The transponder retransmits signals received from station A back to station A. The transponder may either decode and demodulate the received signals to extract information and then remodulate and recode before transmission, or it may simply shift the entire broadband signal in frequency and retransmit. The additional equipment required is shown in FIG. 5 connected to the transmitter 1 and receiver 10 which are located in the same station. The phase difference between the sub-carrier clock 4 in the transmitter 1 and the output of the voltage controlled oscillator 24 of the receiver 10, as received back from the transponder in another station movable relative to the first station, is a fine measure of the range between the two stations. The output of sub-carrier clock 4 is coupled to a mechanical phase shifter 28 and the output of phase shifter 28 is coupled to a phase discriminator 29. The output of voltage controlled oscillator 24 is also coupled to phase discriminator 29.

Figure 6:
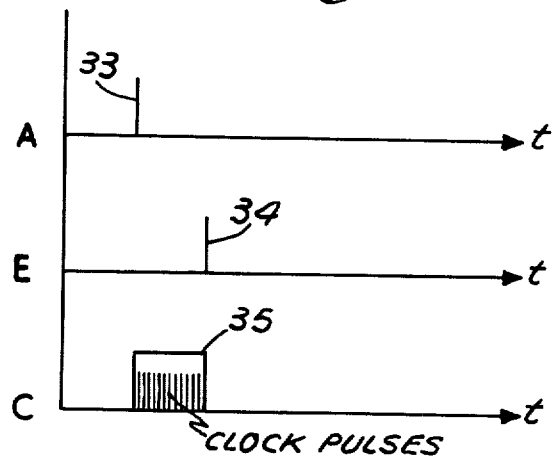
FIG. 6 is a graph to illustrate the operation of the system of FIG. 5.

The output of the phase discriminator 29 is coupled to a ranging servo 30 which drives the mechanical phase shifter 28 to null out the phase difference between the clock frequency and the oscillator output. The shaft position then represents range. This phase measurement is merely the fine range in a 600 meter interval where the clock frequency is 500 kc, for example. The coarse range is obtained by using the code generators in the transmitter and receiver. The transponder is a device which has its transmitted code in synchronism with its received code. Thus code generator 13 is in synchronism (except for propagation delay) with the transmitted code of station B, hence the received code of station B, hence (except for two-way propagation delay) with code generator 6. Gate 32 is opened by the beginning of the codeword from code generator 6 and closed by the beginning of the codeword from code generator 13, and is thus indicative of delay between them and hence range. The output of the subcarrier clock 4 is coupled to a pulse generator 31 where the sine wave cycles are converted to pulses. The outputs of pulse generator 31 and code generators 6 and 13 are coupled to a transmission gate 32. As shown in FIG. 6, the transmission gate 32 is opened at the beginning 33 of the transmitter code and closed at the beginning 34 of the receiver code to form a gate 35. The beginning of the transmitter code and receiver code is a distinctive pulse in the shift register output of the code generator referred to in the IRE article cited above as shown on page 563 of the said article. The number of cycles of the clock reference within the gate is counted in counter 33a and is an indication of the multiples of 600 meters in the range. The fine and coarse range together comprise the total range. The code generators 6 and 13 are N-stage shift registers and the maximal length binary sequence has a period $m = 2^n - 1$. There must occur at one point in the period a positive output from all the stages of the shift register. This can be detected by a comparison circuit such as described in "Arithmetic Operations in Digital Computers" by R. K. Richards, published in 1955 on pages 290 and 291. Such a comparison circuit for each code generator can be included in the transmission gate and as described in the publication will produce for each code generator an output pulse which can be used here as a marker pulse to denote the beginning 33 of the transmitter code and the beginning 34 of the receiver code, both pulses as explained above forming the gate 35. Since the receiver code generator is synchronized to the transmitter code generator, and both of them are disposed at the same location, then the time difference between the start of the transmitter code in the transmitter code generator and the start of the code in the receiver code generator is equivalent to the time delay between the transmission of the signals from station A and the receiving of these signals at station A reflected back from station B, the transponder.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a secure communication and ranging system having a transmitter and receiver at a first location and a transponder at a different location, comprising for said transmitter first means to modulate a first signal with a second signal and a desired signal, means responsive to said second signal to produce an encoding signal, second means to encode the output of said first modulating means with said encoding signal and means to transmit the output of said modulating encoding means, said transponder comprising means to receive the transmitted signals and means to transmit signals in response to the received signals from said transmitter, said receiver at said first location being responsive to said transmitted signals from said transponder and comprising means to decode said received signals with a decoding signal, means to derive said second signal from the decoded signal, means responsive to said derived second signal to produce said decoding signal identical to said encoding signal but displaced in time relative to the distance between said transmitter and said transponder and means responsive to said time displacement between said encoding signal and said decoding signal to determine the range of said transponder from said first location.

2. In a secure communication and ranging system having a transmitter and receiver at a first location and a transponder at a different location comprising for said transmitter first means to modulate a first signal with a second signal and a desired signal, means responsive to said second signal to produce an encoding signal, second means to encode the output of said first modulating means with said encoding signal, means to transmit the output of said encoding means, said transponder comprising means to receive the transmitted signals, and means to transmit signals in response to the received signals from said transmitter, said receiver at said first location being responsive to said transmitted signals from said transponder and comprising means to decode said received signals with a decoding signal, means to derive said second signal from the decoded signal, means responsive to said derived second signal to produce said decoding signal identical to said encoding signal but displaced in time relative to the distance between said transmitter and said transponder and means responsive to said time displacement between said encoding signal and said decoding signal and the phase differencce between said transmitted second signal and said derived second signal to determine the range of said transponder from said first location.

3. In a secure communication and ranging system having a transmitter and receiver at a first location and a transponder at a different location comprising for said transmitter first means to modulate a first signal with a second signal and a desired signal, means responsive to said second signal to produce an encoding signal, second means to encode the output of said first modulating means with said encoding signal and means to transmit the output of said encoding means, said transponder comprising means to receive the transmitted signals and means to transmit signals in response to the received signals from said transmitter, said receiver at said first location being responsive to said transmitted signals from said transponder and comprising means to decode said received signals with a decoding signal, means to derive said second siganl from the decoded signal, means responsive to said derived second signal to produce said decoding signal identical to said encoding signal but displaced in time relative to the distance between said transmitter and said transponder and means responsive to said time displacement between said encoding signal and said decoding signal and the phase difference between said transmitted second signal and said derived second signal to produce a coarse and fine indication respectively of the range of said transponder from said first location.

4. In a secure communication and ranging system having a transmitter and receiver at a first location and a transponder at a different location comprising for said transmitter first means to modulate a carrier signal with a subcarrier signal and a desired signal, a first code generator synchronized to said subcarrier signal, second means to encode the output of said first modulating means with the output of said code generator and means to transmit the output of said encoding, said transponder means to receive the transmitted signal and means to transmit a signal in response to the received signal from said transmitter, said receiver at said first location being responsive to said transmitted signal from said transponder and comprising means to decode said received signal, means to derive said subcarrier signal from said decoded signal, a second code generator, means coupling the output of said second code generator to said decoding means, means synchronizing said second code generator to said derived subcarrier whereby the output of said second code generator is made identical to the output of said first code generator but displaced in time relative to the distance between said transmitter and said transponder and means responsive to said time displacement between the output of said first code generator and the output of said second code generator and the phase difference between said transmitted subcarrier signal and said derived subcarrier signal to determine the range of said transponder from said first location.

5. In a secure communication system, a transmitter comprising first means to modulate a first signal with a second signal and a desired signal, means responsive to said second signal to produce an encoding signal, means to encode the output of said first modulating means with said modulating signal, means to transmit the output of said encoding means, a receiver responsive to the transmitted signal and comprising means to decode the received signal with a decoding signal, means to derive said second signal from the decoded signal and means responsive to said derived second signal to produce said decoding signal identical to said encoding signal but displaced in time relative to the distance between said transmitter and said receiver.

6. In a secure communication system, a transmitter comprising first means to modulate a carrier wave with a subcarrier wave and a desired signal, means responsive to said subcarrier wave to produce an encoding signal, means to encode the output of said first modulating means with the encoding signal, means to transmit the output of said encoding means, a receiver responsive to the transmitted signal and comprising means to decode said transmitted signal with a decoding signal, means to derive said subcarrier wave from the decoded signal and means responsive to said derived subcarrier wave to produce said decoding signal identical to said encoding signal of said transmitter but displaced in time relative to the distance between said transmitter and said receiver.

7. In a secure communication system a transmitter comprising first means to modulate a carrier wave with a subcarrier wave and a desired signal, a first code generator synchronized to said subcarrier wave, second means to encode the output of said first modulating means with the output of said code generator, means to transmit the output of said encoding means, a receiver responsive to said transmitted signal and comprising means to demodulate the transmitted signal, means to derive said subcarrier wave from the decoded signal, a second code generator, means coupling the output of said second code generator to said decoding means, and means synchronizing said second code generator to said derived subcarrier signal whereby the output of said second code generator is made identical and phase to the output of said first code generator but displaced in time relative to the distance between said transmitter and said receiver.

8. In a secure communication system, a transmitter comprising means to modulate a carrier wave with a subcarrier wave and a desired signal, means responsive to said subcarrier wave to spread the spectrum of the output of said modulating means, means to transmit the spectrum spreaded signal, a receiver responsive to said transmitted signal and comprising means to reduce the spectrum of said received signal, means to derive said subcarrier wave from said reduced signal, and means synchronizing said spectrum reducing means to said derived subcarrier wave whereby the output of said spectrum reducing means is identical to the output of said modulating means but displaced in time relative to the distance between said transmitter and said receiver.

9. In a secure communication system a transmitter comprising first means to modulate a carrier wave with a subcarrier wave and a desired signal, a first code generator synchronized to said subcarrier wave, means responsive to said first code generator to spread the spectrum of the output of said first modulating means, means to transmit said spectrum spreaded signal, a receiver responsive to the transmitted signal, and comprising means to decode the transmitted signal, means to derive said subcarrier wave from said decoded signal, a second code generator coupled to said decoding means and means synchronizing said second code generator to said derived subcarrier wave whereby the output of said second code generator is made identical to the output of said first code generator but displaced in time relative to the distance between said transmitter and said receiver and the spectrum of said received signal is reduced and made equal to the spectrum of said output of said first modulation means.

10. In a secure communication system a transmitter comprising first means to modulate a carrier wave with a subcarrier wave and a desired signal to produce a narrow bandwidth radio frequency signal, a first code generator synchronized to said subcarrier wave, a first balanced modulator, means coupling the output of said first modulating means and said code generator to said first balanced modulator whereby the output of said balanced modulator is a signal having a spread frequency spectrum greater than said narrow bandwidth signal, means to transmit the output of said first balanced modulator, a receiver responsive to said transmitted signal and comprising a second code generator, decoding means responsive to the output of said second code generator and to the received signal to derive said narrow bandwidth signal, first detection means to derive said desired signal and said subcarrier wave, a second detection means coupled to the output of said first detection means to produce as the output of said second detection means a signal equal in frequency and phase with said received subcarrier wave, means coupling the output of said second detection means to the input of said second code generator whereby said second code generator is synchronized to said subcarrier wave output of said second detection means, and the output of said second code generator is made identical to the output of said first code generator but displaced in time relative to the distance between said transmitter and said receiver and the spectrum of said received signal is reduced and made equal to the spectrum of said narrow bandwidth radio frequency signal.

11. In a secure communication system a transmitter comprising first means to modulate a carrier wave with a subcarrier wave and a desired signal to produce a narrow bandwidth radio frequency signal, a first code generator synchronized to said subcarrier wave, a first balanced modulator, means coupling the output of said first modulating means and said code generator to said first balanced modulator whereby the output of said balanced modulator is a signal having a spread frequency spectrum greater than said narrow bandwidth signal, means to transmit the output of said first balanced modulator, a receiver responsive to the transmitted signal and comprising a second code generator, decoding means responsive to the output of said second code generator and to the received signal to derive said narrow bandwidth signal, first detection means, means coupling said narrow bandwidth signal to said first detection means, a first phase locked loop coupled to said first detection means to control said first detection means to produce as the output thereof said desired signal and said subcarrier wave, second detection means coupled to the output of said first detection means, a second phase locked loop coupled to said second detection means to control said second detection means to produce as the output thereof a signal equal in frequency and phase with said received subcarrier wave, means coupling the output of said second detection means to the input of said second code generator whereby said second code generator is synchronized to said subcarrier wave output of said second detection means and the output of said second code generator is made identical to the output of said first code generator but displaced in time relative to the distance between said transmitter and said receiver and the spectrum of said received signal is reduced and made equal to the spectrum of said narrow bandwidth radio frequency signal.

12. In a secure communication system a transmitter comprising first means to modulate a carrier wave with a subcarrier wave and a desired signal to produce a narrow bandwidth radio frequency signal, a first code generator synchronized to said subcarrier wave, a first balanced modulator, means coupling the output of said first modulating means and said code generator to said first balanced modulator whereby the output of said balanced modulator is a signal having a spread frequency spectrum greater than said narrow bandwidth signal, means to transmit the output of said first balanced modulator, a receiver responsive to the transmitted signal and comprising a second code generator, decoding means responsive to the output of said second code generator and to the received signal to derive said narrow bandwidth signal, a first phase detector, means coupling said narrow bandwidth signal to said first phase detector, a first phase locked loop comprising a first voltage controlled oscillator coupled to said first phase detector and a first low pass filter coupling the output of said phase detector to said voltage controlled oscillator whereby the output of said first phase detector is said desired signal and said subcarrier wave, a second phase locked loop coupled to the output of said first phase detector and comprising a second phase detector, a second voltage controlled oscillator, a second low pass filter coupling the output of said second phase detector to said voltage controlled oscillator and an electronic phase shifter coupling the output of said second voltage controlled oscillator to said second phase detector to produce as the output of said second voltage controlled oscillator a signal equal in frequency and phase with said received subcarrier wave, means coupling the output of said second voltage controlled oscillator to the input of said second code generator whereby said second code generator is synchronized to said subcarrier wave output of said second voltage controlled oscillator and the output of said second code generator is made identical to the output of said first code generator but displaced in time relative to the distance between said transmitter and said receiver and the spectrum of said received signal is reduced and made equal to the spectrum of said narrow bandwidth radio frequency signal.

13. In a secure communication system a transmitter comprising first means to modulate a carrier wave with a subcarrier wave and a desired signal to produce a narrow bandwidth radio frequency signal, first means to multiply the frequency of said subcarrier wave, a first code generator synchronized to the multiplied frequency of said subcarrier wave, a first balanced modulator, means coupling the output of said first modulating means and said code generator to said first balanced modulator whereby the output of said balanced modulator is a signal having a spread frequency spectrum greater than said narrow bandwidth signal, means to transmit the output of said first balanced modulator, a receiver responsive to the transmitted signal and comprising a second code generator, decoding means responsive to the output of said second code generator and to the received signal to derive said narrow bandwidth signal, a first phase detector, means coupling said narrow bandwidth signal to said first phase detector, a first phase locked loop comprising a first voltage controlled oscillator coupled to said first phase detector and a first low pass filter coupling the output of said phase detector to said voltage controlled oscillator whereby the output of said first phase detector is said desired signal and said subcarrier wave, a second phase locked loop coupled to the output of said first phase detector and comprising a second phase detector, a second voltage controlled oscillator, a second low pass filter coupling the output of said second phase detector to said voltage controlled oscillator and an electronic phase shifter coupling the output of said second voltage controlled oscillator to said second phase detector to produce as the output of said second voltage controlled oscillator a signal equal in frequency and phase with said received subcarrier wave, second means to multiply said subcarrier wave output of said second voltage controlled oscillator coupled to the output of said electronic phase shifter, means coupling the output of said second multiplier to the input of said second code generator whereby said second code generator is synchronized to said subcarrier wave output of said second voltage controlled oscillator and the output of said second code generator is made identical to the output of said first code generator but displaced in time relative to the distance between said transmitter and said receiver and the spectrum of said received signal is reduced and made equal to the spectrum of said narrow bandwidth radio frequency signal.

14. In a secure communication and ranging system having a transmitter and receiver at a first location and a transponder at a different location comprising for said transmitter first means to modulate a carrier wave with a subcarrier wave and a desired signal to produce a narrow bandwidth radio frequency signal, a first code generator synchronized to said subcarrier wave, a first balanced modulator, means coupling the output of said first modulating means and said code generator to said first balanced modulator whereby the output of said balanced modulator is a signal having a spread frequency spectrum greater than said narrow bandwidth signal, and means to transmit the output of said first balanced modulator, said transponder comprising means to receive the transmitted signals and means to transmit signals in response to the received signals from said transmitter, said receiver at said first location being responsive to said transmitted signal from said transponder and comprising a second code generator, decoding means responsive to the output of said second code generator and to said received signal to derive a narrow bandwidth signal, a first phase detector, means coupling said narrow bandwidth signal to said first phase detector, a first phase locked loop comprising a first voltage controlled oscillator coupled to said first phase detector and a first low pass filter coupling the output of said phase detector to said voltage controlled oscillator whereby the output of said first phase detector includes said subcarrier wave, a second phase locked loop coupled to the output of said first phase detector and comprising a second phase detector, a second voltage controlled oscillator, a second low phase filter coupling the output of said second phase detector to said voltage controlled oscillator and an electronic phase shifter coupling the output of said second voltage controlled oscillator to said second phase detector to produce as the output of said second voltage controlled oscillator a signal equal in frequency and phase with said received subcarrier wave, means coupling the output of said second voltage controlled oscillator to the input of said second code generator whereby said second code generator is synchronized to said subcarrier wave output of said second voltage controlled oscillator and the output of said second code generator is made identical to the output of said first code generator but displaced in time relative to the distance between said transmitter and said transponder and the spectrum of said received signal is reduced and made equal to the spectrum of said narrow bandwidth radio frequency signal, means to compare the phase of said transmitted subcarrier wave and said subcarrier wave output of said second voltage controlled oscillator, said phase difference being a fine indication of the range of said transponder from said first location, means to count the number of cycles of said transmitter subcarrier wave in the interval between the start of a code word in said first code generator and the start of a code word in said second code generator, said count representing a coarse indication of the range of said transponder from said first location, the total of said coarse and fine indications representing the total range of said transponder from said first location.

15. In a secure communication system a transmitter comprising first means to modulate a carrier wave with a sub-carrier wave and a desired signal, a code generator synchronized to said sub-carrier wave, second means to modulate the output of said first modulating means with the output of said code generator, and means to transmit the output of said second modulating means to a distant receiver.

16. In a secure communication system a receiver responsive to the transmission of signals from a transmitter, said transmitted signals having desired signals modulated with a sub-carrier wave and the output of a code generator, comprising: means to decode said transmitted signal, means to derive said sub-carrier wave from the decoded signal, a code generator, means coupling the output of said code generator to said decoding means and means synchronizing said code generator to said derived sub-carrier signal whereby the output of said receiver code generator is made identical to the output of the transmitter code generator but displaced in time relative to the distance between said transmitter and said receiver.

* * * * *